United States Patent [19]
Dellert et al.

[11] Patent Number: 5,267,051
[45] Date of Patent: Nov. 30, 1993

[54] HIGH SPEED COMPRESSION OF IMAGERY DATA

[75] Inventors: David W. Dellert; Frank Weiner, both of Rochester, N.Y.

[73] Assignee: Eastman Kodak Company, Rochester, N.Y.

[21] Appl. No.: 938,565

[22] Filed: Aug. 28, 1992

Related U.S. Application Data

[63] Continuation of Ser. No. 455,116, Dec. 22, 1989, abandoned.

[51] Int. Cl.$^5$ .................. H04N 1/41; G06K 9/36
[52] U.S. Cl. .................... 358/426; 358/432; 382/56
[58] Field of Search ........... 358/426, 261.3, 432, 358/433, 425, 133, 134, 138; 382/41, 56

[56] References Cited

U.S. PATENT DOCUMENTS

| | | | |
|---|---|---|---|
| 4,495,562 | 1/1985 | Yamaji et al. | 364/200 |
| 4,706,265 | 11/1987 | Furukawa | 375/122 |
| 4,754,492 | 6/1988 | Malvar | 382/41 |
| 4,772,956 | 9/1988 | Roche et al. | 358/260 |
| 5,033,106 | 7/1991 | Kita | 358/426 |
| 5,057,940 | 10/1991 | Murakami et al. | 358/426 |

Primary Examiner—Edward L. Coles, Sr.
Assistant Examiner—Thomas D. Lee
Attorney, Agent, or Firm—Mark Z. Dudley; Stuart T. F. Huang

[57] ABSTRACT

A system for processing a bit map of pixel data signals representative of a multi-dimensional array of imagery data (e.g. alpha-numeric text) for transmission over a facsimile communication channel are compressed by providing a plurality of data compression units, a respective one of which is capable of compressing data supplied to it at a compression rate that is only a fraction of the data rate. The bit map is subsampled by demultiplexing the bit map into sub-arrays of data. The sub-array data is coupled to respective sets of compression units, which executes parallel, two-dimensional compression of the demultiplexed sub-array data. Even though the data subsamples associated with successive rows of the bit map are non-consecutive, and therefore may contribute to a reduction in compression performance in the horizontal direction, because the data is text, successive data samples within each column of a sub-array are inherently more highly correlated with one another than data values that are encountered within respective rows of the original bit map. As a consequence, the two-dimensional data compression operator executed by each unit suffers no loss in output signal quality.

33 Claims, 3 Drawing Sheets $$31 \begin{cases} P_{0,0} & P_{0,2} & P_{0,4} & P_{0,6} & \cdots \\ P_{1,0} & P_{1,2} & P_{1,4} & P_{1,6} & \cdots \\ P_{2,0} & P_{2,2} & P_{2,4} & P_{2,6} & \cdots \\ P_{3,0} & P_{3,2} & P_{3,4} & P_{3,6} & \cdots \\ & & \vdots & & \\ P_{N,0} & P_{N,2} & P_{N,4} & P_{N,6} & \cdots \end{cases}$$

*FIG. 2*

$$32 \begin{cases} P_{0,1} & P_{0,3} & P_{0,5} & P_{0,7} & \cdots \\ P_{1,1} & P_{1,3} & P_{1,5} & P_{1,7} & \cdots \\ P_{2,1} & P_{2,3} & P_{2,5} & P_{2,7} & \cdots \\ P_{3,1} & P_{3,3} & P_{3,5} & P_{3,7} & \cdots \\ & & \vdots & & \\ P_{N,1} & P_{N,3} & P_{N,5} & P_{N,7} & \cdots \end{cases}$$

*FIG. 3* ype of data
⊥ipment, and
d transmissi
  personal com
ata is most
 in which th
 or printed te
 or down-the-

FIG. 4

HIGH SPEED COMPRESSION OF IMAGERY DATA

This is a continuation of application Ser. No. 455,116, filed Dec. 22, 1989, now abandoned.

FIELD OF THE INVENTION

The present invention relates in general to imagery signal processing and is particularly directed to a system for executing high speed compression of imagery data, particularly alpha-numeric text, by parallel processing of subsampled pixel data, so as to facilitate high speed data communication of the imagery data over a digital communication link, such as that employed for facsimile communication and image reconstruction.

BACKGROUND OF THE INVENTION

Because currently manufactured facsimile systems use relatively low cost signal processing components that are available from a wide variety of chip suppliers, it has been possible to keep the price of individual transceiver units reasonably low, so that the facsimile equipment market presently enjoys mass appeal. One of the major components that governs the cost of the system is the compression unit through which signals (output from an optical scanner), representative of the contents of a document, are compressed and formatted for transmission to a remote terminal unit. Such compression units customarily use some form of one or two-dimensional Huffman encoding mechanism that has been optimized to compress the text-representative data 'across the page' and typically operate at a signal processing rate of up to five megabits per second, and more commonly on the order of one to two megabits per second. As a result, conventional, mass market facsimile systems, regardless of the input data rate, are capable of achieving a document processing rate of only about one page per minute. In this regard, even though a high data rate (e.g. 10–12 Mb/s) optical scanner may be used to convert the printed text to digital data, because of the slow processing speed of the compression chip, it is necessary to buffer the input data until it can be accessed at the slower rate of the compression mechanism, thus increasing system cost without an improvement in document processing speed.

SUMMARY OF THE INVENTION

In accordance with the present invention, this limitation in document processing speed of conventional facsimile transmission systems is dramatically increased without the need for extra storage capability (intermediate buffering) or the additional cost of computationally complex compression modules, so that document processing speeds in excess of at least an order of magnitude greater than conventional units may be achieved. To this end, rather than directly compress successive data samples in the order they are supplied in an 'across the page', line by line format, the signal processing system according to the present invention subdivides or subsamples the data into respective sub-arrays of pixel data, the rate of occurrence of successive ones of which is lower than the original data, particularly at a rate of occurrence which is processing speed-compatible with the compression speed of readily available compression chips. These subsample arrays of data are then coupled to respective lower speed compression units to effect a parallel compression of the subsampled data.

Namely, because the data rate of successive data values within the subsampled arrays is only a fraction of the rate at which successive data values are supplied by the optical scanning device, it is possible to make use of the above-mentioned, low cost compression units to perform the compression operation. The number of compression units required will depend upon the intended data rate and the compression rate of an individual compression chip. As pointed out previously, readily available, low cost chips can typically handle data rates on the order of one to five megabits. Consequently, for a ten to twelve megabits per second communication channel the number of compression chips required will be on the order of two to ten. However, such chips are considerably less expensive than the cost of memory units that would be necessary in the course of compressing the bit map data at the high input data rates. The compressed subsampled data is then combined for transmission over a high data rate communication channel to a receiver site.

At the receiver site, successive portions of the compressed signals that have been transmitted over the communication channel from the transmitter site are coupled to respective ones of a plurality of parallel data decompression units, which produce decompressed output signals. The decompressed output signals produced by the decompression units are coupled to a parallel-serial shift register. By serially reading out the contents of the shift register, there is obtained a reconstructed serial data stream representative of the multi-dimensional array of imagery data sample values.

Now although subsampling the data into sub-arrays tends to reduce the correlation properties of the data (since successive samples of a sub-array occur only every kth data value or pixel of the original imagery data or bit), and thus implies a reduction in compression performance, according to the present invention, this minor reduction in the correlation properties of data subsamples in the 'across the page' or horizontal direction of the bit map is offset by taking advantage of an inherent correlation property of the type of data (e.g text) most frequently transmitted by facsimile equipment and parallel-compressing the data 'down the page'.

More particularly, for normal alpha-numeric text and business, personal computer-generated graphics, the direction in which the data is most high correlated is generally orthogonal to the that in which the text is optically scanned (across the page). The shapes of typed or printed text tend to have a significant component in the vertical or down-the-page direction, rather than in the horizontal direction, so that successive samples of an image of a page (multiple lines) of text will usually undergo fewer transitions (e.g. dark to light) in the vertical direction than in the horizontal direction. As a result, what each of the parallel compression units sees is a more highly correlated signal stream than would be encountered if the data were supplied to the compression units from a horizontal or row-direction readout of the bit map.

In accordance with a preferred embodiment of the present invention, signals representative of a multi-dimensional array of imagery data sample values (e.g. alpha-numeric text) for transmission over a communication channel at a prescribed data rate are compressed by providing a plurality of data compression units, a respective one of which is capable of compressing data supplied to it at a compression rate (e.g. one to five Mb/s) that is a fraction of the transmission data rate (e.g. 10–12 Mb/s). The bit map, respective pixel locations of which are associated with the signals to be transmitted, is then subsampled or subdivided by demultiplexing the successive data (pixel) values of the successive rows of the map into a plurality of sub-arrays of data successive ones of which correspond to every kth data value of the original map. The data values of the sub-arrays are then coupled to respective sets of compression units, each of which is associated with a respective sub-array and is of the type which is capable of executing two-dimensional compression of its input data. Even though the data subsamples associated with the successive rows of the bit map are non-consecutive, and therefore may contribute to a reduction in compression performance in the horizontal direction, successive data samples within each column of a sub-array are inherently more highly correlated with one another than data values that are encountered within respective rows of the original bit map. As a consequence, the two-dimensional data compression operator executed by each unit suffers no loss in output signal quality. The compressed output signals are then combined for transmission over the (facsimile) communication channel to a receiver site.

At the receiver site, successive portions of the compressed signals that have been transmitted over the communication channel from the transmitter site are coupled to respective ones of a plurality of data decompression units, which produce decompressed output signals. The decompressed output signals produced by the decompression units are coupled to a parallel-serial shift register. By serially reading out the contents of the shift register, there is obtained a reconstructed serial data stream representative of the multi-dimensional array of imagery data sample values.

BRIEF DESCRIPTION OF THE DRAWINGS

FIGS. 2 and 3 show respective sub-arrays of bit map data demultiplexed by the system of FIG. 1; and FIG. 4 shows an enlarged section of text.

DETAILED DESCRIPTION

Figure 1:
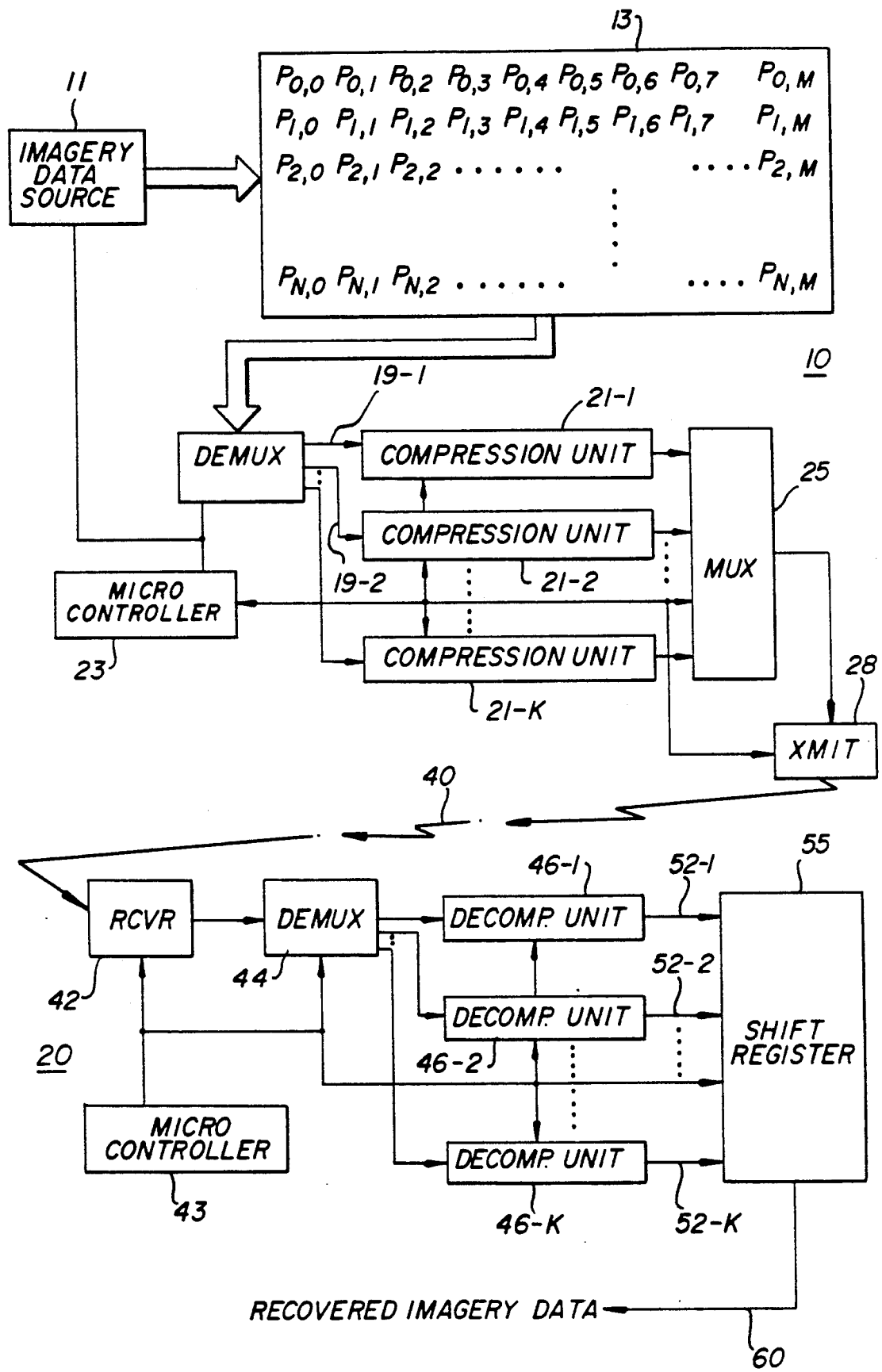
FIG. 1 is a block diagram of an embodiment of an imagery data communication system which employs the improved compression mechanism in accordance with the present invention.

Before describing in detail the particular improved imagery data compression system in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, a block diagram of an embodiment of an imagery data communication system which employs the improved compression mechanism in accordance with the present invention is illustrated as comprising a transmitter site 10 having an imagery data source 11 (e.g. an opto-electronic document scanner which is arranged to effect raster type scan of a document, such as successively fed pages of printed text), data source 11 producing a series of digitally encoded signals respectively representative of successively sampled grey level values of the (text) image. As document scanner 11 typically performs a raster type scan of the document, line by line, down the page, each of the encoded signal values corresponds to a respective pixel location in a bit map 13 of the scanned image, the bit map effectively comprising a two-dimensional array of pixel data, M (e.g. 1768) columns wide by N (e.g. 2200) rows deep.

As discussed above, because the data rate of present day imagery data scanning equipment is considerably faster than the signal processing speed of the low cost compression modules customarily employed by commercial facsimile equipment, the document processing speed of that equipment has been limited to a very low volume on the order of about one page per minute. The reason for this shortcoming is the fact that the compression mechanism has operated on the data in essentially the same serial (raster) format as by the imagery data source. Even with multiline, two-dimensional image compression, the overall processing speed has been constrained by its slowest component, the compression module.

As described above, in accordance with the present invention, this limitation in document processing speed of conventional facsimile transmission systems is dramatically increased by effectively subsampling or subdividing bit map 13 into a plurality of sub-arrays of data, successive ones of the data contents of the sub-arrays corresponding to every kth data value of the original map. For this purpose, the original imagery data bit map is coupled to a demultiplexer 15, K respective output ports 17-1 . . . 17-K of which are coupled to a plurality of data compression units 21-1 . . . 21-K, each of which is capable of carrying out two-dimensional compression on the sub-array of data applied to it. As mentioned previously, a respective one of compression units 21-1 . . . 21-K may be a readily commercially available unit, commonly employed in mass market facsimile equipment and capable of compressing data supplied to it at a compression rate (e.g. one to five Mb/s) that is a fraction of the transmission data rate (e.g. 10–12 Mb/s) from imagery data source 11.

Under the control of an associated microcontroller 23, demultiplexer 15 subdivides bit map 13 into K sub-arrays of pixel data. For purpose of simplicity of a non-limiting illustration, letting K=2, the sub-divided bit map may be demultiplexed into a pair of respective sub-arrays 31 and 32, as diagrammatically illustrated in FIGS. 2 and 3, respectively. (Bit map 13 and sub-array 31 and 32 conceptually illustrate pixels as organized as two-dimensional arrays. It is not necessary for the arrays to be physically stored in memory.) As noted previously, where the image represented by the pixel data is a typical document transmitted by facsimile, such as a page of alpha numeric characters, there is a substantial inherent high correlation property among successive data samples, due to the 'elongated' nature of the text, in the vertical or 'down the page' direction, as exemplified by portions of alpha numeric characters lying along line L in the enlarged section of text shown in FIG. 4. Consequently, even though, for respective rows of the bit map 13, the data subsamples of sub-arrays 31 and 32 are non-consecutive (e.g. pixel values P0,0, P0,2, P0,4, P0,6, ... of row 0 of sub-array 31 shown in FIG. 2) and therefore may contribute to a reduction in compression performance in the horizontal direction, successive data samples within each column of a sub-array (e.g. pixel values P0,0, P0,0, P2,0, P3,0, ..., Pn,0 of column 0 of sub-array 31) are inherently more highly correlated with one another than data values that are encountered within respective rows of the original bit map 13. As a consequence, the two-dimensional data compression operator executed by each compression unit 21 suffers no loss in output signal quality. The compressed output signals from compression units 21 are coupled to an output multiplexer 25 to be combined for high data rate transmission (e.g. on the order of 10–12 Mb/s) via a (digital telecommunications) transmitter modem 28, over a (facsimile) communication channel 40 (e.g. digital telephone channel) to a receiver site 20.

At the receiver site 20, a receiver modem 42 outputs the compressed data signals that have been transmitted over communication channel 40 from transmitter site 10 to a demultiplexer 44, which, under the control of a receiver site microcontroller 43, controllably separates the incoming compressed data stream into respective output segments for application, via output ports 44-1 ... 44-K, to a plurality of data decompression units 46-1 ... 46-K. Like the compression units within the transmitter site 10, each of decompression units 46-1 ... 46-K may be a readily commercially available unit, commonly employed in mass market facsimile equipment and capable of effecting a two-dimensional decompression of data supplied to it at a compression rate (e.g. one to five Mb/s) that is a fraction of the transmission data rate (e.g. 10–12 Mb/s) over channel 40.

The decompressed output signals produced by the decompression units 46 are coupled to parallel input ports 52-1 ... 52-K of a parallel-serial shift register 55. As the contents of shift register 55 are serially read out over serial output data, there is obtained a reconstructed serial data stream representative of the original bit map of imagery data sample values.

As will be appreciated from the foregoing description, by subsampling high data rate imagery data into respective sub-arrays prior to data compression, it is possible to employ low cost readily available compression units whose processing speed is considerably less than the transmission data rate. Namely, because the data rate of successive data values within the subsampled arrays is only a fraction of the rate at which successive data values are supplied by the optical scanning device and transmitted over a facsimile communication channel, it is possible to make use of low cost compression units, without adding considerable buffer memory capacity at each end of the compression, decompression process.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

We claim:

1. A method of processing multidimensional image-representative data signals, respective ones of which are definable in the form of a two-dimensional map array of M columns by N rows of pixel data signals, comprising steps of:
   (a) receiving the array in an electronic circuit;
   (b) sub-sampling said array of pixel data signals in the electronic circuit at a sub-sampling rate to produce sub-arrays of pixel data signals at respective sub-rates, each of said sub-rates being compatible with the compression speed of a respective one of a plurality of two-dimensional data compression units, wherein successive ones of the data signals of a respective sub-array of data correspond to every Kth data value of said data map;
   (c) coupling respective sub-arrays of pixel data signals to respective ones of said plurality of two-dimensional data compression units, so as to effect a parallel compression of the each of said sub-arrays of sub-sampled data signals, each of said compression units producing compression output signals representative of a compressed sub-array of pixel data signals; and
   (d) combining the compression output signals produced in step (c) to produce a composite compression signal representative of said image representative signals.

2. A method according to claim 1, further comprising the steps of:
   (d) transmitting said composite compression signal to a receiver site;
   (e) at said receiver site, receiving said composite compression signal and separating said composite compression signal into a plurality of compressed signals representative of said sub-arrays of pixel data signals;
   (f) coupling respective ones of said compressed signals to respective ones of a plurality of two-dimensional data decompression units so as to effect a parallel decompression of the each of said compressed signals representative sub-arrays of sub-sampled data signals, each of said decompression units producing decompressed output signals representative of a respective sub-array of pixel data signals; and
   (g) combining said decompressed output signals to recover multidimensional image representative data signals.

3. A method according to claim 2, wherein step (g) comprises coupling said decompressed output signals to parallel inputs of a parallel-to-serial shift register unit and serially reading out said decompressed output signals therefrom to recover said image representative data signals.

4. A method according to claim 1, wherein step (d) comprises transmitting said composite signals to said receiver site at a data rate in excess the compression speed of a respective one of said compression units.

5. A method of processing multidimensional image-representative data signals, respective ones of which are definable in the form of a two-dimensional map array of M columns by N rows of pixel data signals, comprising steps of:
   (a) receiving the array in an electronic circuit;
   (b) sub-sampling said array of pixel data signals in the electronic circuit at a sub-sampling rate to produce sub-arrays of pixel data signals at respective sub-rates, each of said sub-rates being compatible with the compression speed of a respective one of a plurality of two-dimensional data compression units;

(c) coupling respective sub-arrays of pixel data signals to respective ones of said plurality of two-dimensional data compression units so as to effect a parallel compression of the each of said sub-arrays of sub-sampled data signals, each of said compression units producing compression output signals representative of a compressed sub-array of pixel data signals; and (d) combining the compression output signals produced in step (c) to produce a composite compression signal representative of said image representative signals;

wherein said multidimensional image representative data signals are derived form an optical scanning device and are representative of alpha-numeric text, the shapes of the characters of which tend to be more highly correlated in a direction that is generally orthogonal to the direction in which the text is optically scanned to produce said image representative signals.

6. A method according to claim 5, wherein successive data signals within each column of a sub-array are more highly correlated with one another than data signals that are encountered within respective rows of said data map.

7. A method of processing multidimensional image-representative data signals, respective ones of which are definable in the form of a two-dimensional map array of M columns by N rows of pixel data signals, comprising steps of:

(a) receiving the array in an electronic circuit;

(b) sub-sampling said array of pixel data signals in the electronic circuit at a sub-sampling rate to produce sub-arrays of pixel data signals at respective sub-rates, each of said sub-rates being compatible with the compression speed of a respective one of a plurality of two-dimensional data compression units;

(c) coupling respective sub-arrays of pixel data signals to respective ones of said plurality of two-dimensional data compression units so as to effect a parallel compression of the each of said sub-arrays of sub-sampled data signals, each of said compression units producing compression output signals representative of a compressed sub-array of pixel data signals; and (d) combining the compression output signals produced in step (c) to produce a composite compression signal representative of said image representative signals;

wherein the number of said compression units is determined in accordance with the ratio of the data rate of said image representative signals to the signal processing speed of a respective one of said compression units.

8. A system for processing multidimensional image representative data signals, respective ones of which are definable in the form of a two-dimensional map array of M columns by N rows of pixel data signals, comprising:

an input for receiving the array;

a data signal subdividing device, coupled to and sub-sampling said array of data signals at a sub-sampling rate to produce sub-arrays of pixel data signals at respective sub-rates, each of said sub-rates being compatible with the compression speed of plurality of two-dimensional data compression units, wherein said data signal subdividing device comprises a demultiplexer which couples every Kth data signal of said map array to a respective one of said compression units;

a plurality of two-dimensional data compression units, respective ones of which are coupled to receive respective ones of said sub-arrays of pixel data signals, and carrying out a parallel compression of the each of said sub-arrays of sub-sampled data signals, each of said compression units producing compression output signals representative of a compressed sub-array of pixel data signals; and a compression output signal combining unit which combines said compression output signals to produce a composite compression signal representative of said multidimensional image representative signals.

9. A system according to claim 8, further comprising:

a transmitter coupled to said compression signal combining unit and transmitting said composite compression signal over a communication channel to a receiver site.

10. A system according to claim 9, further comprising, at said receiver site, a receiver unit which receiver said composite compression signal, a demultiplexer which separates said composite compression signal into a plurality of compressed signals representative of said sub-array of pixel data signals, and a plurality of two-dimensional data decompression unit, to respective ones of which respective ones of said plurality of compressed signals are coupled, so as to effect a parallel decompression of the each of said compressed signals respective sub-array of subsampled data, each of said decompression units producing decompressed output signals representative of a respective sub-array of pixel data signals, and a signal combining unit which combines said decompressed output signals to recover multidimensional image representative data signals.

11. A system according to claim 10, wherein said communication channel comprises a facsimile transmission communication channel.

12. A system according to claim 9, wherein said transmitter transmits said composite signals to said receiver site at a data rate in excess the compression speed of a respective one of said compression units.

13. A system according to claim 9, wherein said compression signal output combining unit comprises a parallel-to-serial shift register to parallel inputs of which said decompressed output signals are coupled, said shift register serially reading out said decompressed output signals therefrom to recover said image representative data signals.

14. A system for processing multidimensional image representative data signals, respective ones of which are definable in the form of a two-dimensional map array of M columns by N rows of pixel data signals, comprising:

an input for receiving the array;

a data signal subdividing device, coupled to and sub-sampling said array of data signals at a sub-sampling rate to produce sub-arrays of pixel data signals at respective sub-rates, each of said sub-rates being compatible with the compression speed of a plurality of two-dimensional data compression units;

a plurality of two-dimensional data compression units, respective ones of which are coupled to receive respective ones of said sub-arrays of pixel data signals, and carrying out a parallel compression of the each of said sub-arrays of sub-sampled data signals, each of said compression units producing compression output signals representative of compressed sub-array of pixel data signals; and a compression output signal combining unit which combines said compression output signals to produce a composite compression signal representative of said multidimensional image representative signals;

wherein said multidimensional image representative data signals are derived from an optical scanning device and are representative of alpha-numeric text, the shapes of the characters of which end to be more highly correlated in a direction that is generally orthogonal to the direction in which the text is optically scanned by an optical scanning device to produce said image representative signals.

15. A system according to claim 14, wherein successive data signals within each column of a sub-array are more highly correlated with one anther than data signals that are encountered within respective rows of said data map.

16. A system for processing multidimensional image representative data signals, respective ones of which are definable in the form of a two-dimensional map array of M columns by N rows of pixel data signals, comprising:

an input for receiving the array;

a data signal subdividing device, coupled to and sub-sampling said array of data signals at a sub-sampling rate to produce sub-arrays of pixel data signals at respective sub-rates, each of said sub-rates being compatible with the compression speed of a plurality of two-dimensional data compression units;

a plurality of two-dimensional data compression units, respective ones of which are coupled to receive respective ones of said sub-arrays of pixel data signals, and carrying out a parallel compression of the each of said sub-arrays of sub-sampled data signals, each of said compression units producing compression output signals representative of compressed sub-array of pixel data signals; and a compression output signal combining unit which combines said compression output signals to produce a composite compression signal representative of said multidimensional image representative signals;

wherein the number of said compression units is determined in accordance with the ratio of the data rate of said image representative signals to the signal processing speed of a respective one of said compression units.

17. A method of processing multidimensional image-representative data signals, respective ones of which are definable in the form of a two-dimensional map array of M columns by N rows of pixel data signals, comprising the steps of:

(a) receiving the array in an electronic circuit;

(b) sub-sampling successive rows of said map array in the electronic circuit at a sub-sampling rate of produce sub-arrays of pixel data signals at respective sub-rates, each of said sub-rates being compatible with the compression speed of a respective one of a plurality of two-dimensional data compression units;

(c) coupling respective sub-arrays of pixel data signals to respective ones of said plurality of two-dimensional data compression units, so as to effect a parallel compression of the each of said sub-arrays of sub-sampled data signals, each of said compression units producing compression output signals representative of a compressed sub-array of pixel data signals; and (d) combining the compression output signals produced in step (c) to produce a composite compression signal representative of said multidimensional image representative signals;

wherein said multidimensional image representative signals are derived form an optical scanning device and are representative of alpha-numeric text, the shapes of the characters of which tend to be more highly correlated in a direction corresponding to the direction of the columns of said bit map array and a sub-array, which is generally orthogonal to the direction in which the text is optically scanned to produce said image representative signals.

18. A method of processing multidimensional image-representative data signals, respective ones of which are definable in the form of a two-dimensional map array of M columns by N rows of pixel data signals, comprising the steps of:

(a) receiving the array in an electronic circuit;

(b) sub-sampling successive rows of said map array in the electronic circuit at a sub-sampling rate of produce sub-arrays of pixel data signals at respective sub-rates, each of said sub-rates being compatible with the compression speed of a respective one of a plurality of two-dimensional data compression units;

(c) coupling respective sub-arrays of pixel data signals to respective ones of said plurality of two-dimensional data compression units, so as to effect a parallel compression of the each of said sub-arrays of sub-sampled data signals, each of said compression units producing compression output signals representative of a compressed sub-array of pixel data signals; and (d) combining the compression output signals produced in step (c) to produce a composite compression signal representative of said multidimensional image representative signals;

wherein the number of said compression units is determined in accordance with the ratio of the data rate of said image representative signals to the signal processing speed of a respective one of said compression units.

19. An electronic method of processing an image represented as an array of pixel signals comprising steps of:

receiving the array in an electronic circuit at a reception rate;

sub-sampling the array in the electronic circuit to produce sub-arrays of pixel signals at respective sub-rates, each sub-rate being less than the reception rate, the aggregate of sub-rates substantially matching the reception rate;

coupling each sub-array to a respective one of a plurality of compression units, the compression units operating in parallel to produce sub-array compression signals representing respective sub-arrays; and combining the sub-array compression signals to produce an aggregate compression signal representing the image.

20. A method according to claim 19 further comprising steps of:
- transmitting the aggregate compression signal to a receiver;
- separating the sub-array compression signals;
- coupling each sub-array compression signal to one of a plurality of decompression units, the decompression units operating in parallel to produce decompressed sub-arrays; and
- combining the decompressed sub-arrays to produce a decompressed array representing the image.

21. A method according to claim 20 wherein the step of transmitting the aggregate compression signal includes a step of transmitting the aggregate compression signal at a rate higher than the rate at which one of the compression units produces a sub-array compression signal.

22. An electronic method of processing an image represented as an array of pixel signals comprising steps of:
- receiving the array in an electronic circuit at a reception rate;
- sub-sampling the array in the electronic circuit to produce sub-arrays of pixel signals at respective sub-rates, each sub-rate being less than the reception rate, the aggregate of sub-rates substantially matching the reception rate;
- coupling each sub-array to a respective one of a plurality of compression units the compression units operating in parallel to produce sub-array compression signals representing respective sub-arrays; and
- combining the sub-array compression signals to produce an aggregate compression signal representing the image;
- wherein the step of sub-sampling the array includes a step of producing K sub-arrays, and each successive sample of a sub-array corresponds to every Kth sample of the array.

23. An electronic method of processing an image represented as an array of pixel signals comprising steps of:
- receiving the array in an electronic circuit at a reception rate;
- sub-sampling the array in the electronic circuit to produce sub-arrays of pixel signals at respective sub-rates, each sub-rate being less than the reception rate, the aggregate of sub-rates substantially matching the reception rate;
- coupling each sub-array to a respective one of a plurality of compression units the compression units operating in parallel to produce sub-array compression signals representing respective sub-arrays; and
- combining the sub-array compression signals to produce an aggregate compression signal representing the image;
- wherein the step of receiving the array includes a step of receiving pixel signals sampled by an optical scanning device and wherein the samples tend to be more highly correlated in a direction which is generally orthogonal to the direction in which the image is scanned.

24. An electronic method of processing an image represented as an array of pixel signals comprising steps of:
- receiving the array in an electronic circuit at a reception rate;
- sub-sampling the array in the electronic circuit to produce sub-arrays of pixel signals at respective sub-rates, each sub-rate being less than the reception rate, the aggregate of sub-rates substantially matching the reception rate;
- coupling each sub-array to a respective one of a plurality of compression units the compression units operating in parallel to produce sub-array compression signals representing respective sub-arrays; and
- combining the sub-array compression signals to produce an aggregate compression signal representing the image;
- the image is represented as a two-dimensional array of rows and columns of pixel signals;
- the step of sub-sampling the array produces sub-arrays having pixels form rows and columns of the array; and
- successive pixels for a column in a sub-array tend to be more highly correlated than successive pixels in rows of the array.

25. A system for processing an image represented as an array of pixel signals comprising:
- a subdividing device receiving pixel signals at a transfer rate, the subdividing device sub-sampling the array to produce sub-arrays at sub-rates, each sub rate being less than the transfer rate, the aggregate of sub-rates substantially matching the transfer rate;
- a plurality of compression units operating in parallel, each compressing one sub-array to produce a respective one of a plurality of sub-array compression signals; and
- a combining unit which combines the plurality of sub-array compression signals to produce a composite compression signal representing the image.

26. A system according to claim 25 further comprising:
- a transmitter coupled to the combining unit and transmitting the aggregate compression signal into a communication channel; and
- a receiver coupled to the communication channel and receiving the aggregate compression signal.

27. A system according to claim 26 further comprising
- a demultiplexer coupled to the receiver and separating the sub-array compression signals;
- a plurality of decompression units each receiving a sub-array compression signal, the decompression units operating in parallel to produce decompressed sub-arrays; and
- a combining unit receiving the decompressed sub-arrays and producing a decompressed array representing the image.

28. A system according to claim 27 wherein the combining unit includes a parallel-to-serial shift register having:
- parallel inputs receiving individual samples of the decompressed sub-arrays; and
- a serial output producing the decompressed array.

29. A system according to claim 26 wherein the transmitter transits a data rate which exceeds the output rate of one of the compression units.

30. A system according to claim 26 wherein the transmission channel is a facsimile transmission channel.

31. A system for processing an image represented as an array of pixel signals comprising:
- a subdividing device receiving pixel signals at a transfer rate, the subdividing device sub-sampling the array to produce sub-arrays at sub-rates, each sub rate being less than the transfer rate, the aggregate of sub-rates substantially matching the transfer rate;

a plurality of compression units operating in parallel, each compressing one sub-array to produce a respective one of a plurality of sub-array compression signals; and a combining unit which combines the plurality of sub-array compression signals to produce a composite compression signal representing the image;

wherein the subdividing device comprises a demultiplexer producing K sub-arrays and couples alternating kth pixel signals of the array to respective sub-arrays.

32. A system for processing an image represented as an array of pixel signals comprising:

a subdividing device receiving pixel signals at a transfer rate, the subdividing device sub-sampling the array to produce sub-arrays at sub-rates, each sub rate being less than the transfer rate, the aggregate of sub-rates substantially matching the transfer rate;

a plurality of compression units operating parallel, each compressing one sub-array to produce a respective one of a plurality of sub-array compression signals; and a combining unit which combines the plurality of sub-array compression signals to produce a composite compression signal representing the image;

wherein the sub dividing device receives pixel signals which are derived form an optical scanner and which tend to be more highly correlated in a direction that is generally orthogonal to the direction in which the image is scanned.

33. A system for processing an image represented as an array of pixel signals comprising:

a subdividing device receiving pixel signals at a transfer rate, the subdividing device sub-sampling the array to produce sub-arrays at sub-rates, each sub-rate being less than the transfer rate, the aggregate of sub-rates substantially matching the transfer rate;

a plurality of compression units operating in parallel, each compressing one sub-array to produce a respective one of plurality of sub-array compression signals; and a combining unit which combines the plurality of sub-array compression signals to produce a composite compression signal representing the image; and wherein the image is represented as a two-dimensional array of rows and columns of pixel signals;

the subdividing device produces sub-arrays of rows and columns; and successive pixels within a column of a sub-array tend to be more highly correlated than successive pixels in rows of the array.

* * * * *